Dec. 23, 1969 J. L. MARTINSON 3,485,168
METHOD FOR FORMING WRITTEN SYMBOLS TO BE READ
BY AUTOMATIC CHARACTER RECOGNITION EQUIPMENT
Filed Feb. 20, 1967 2 Sheets-Sheet 1

INVENTOR
JOHN L. MARTINSON
BY Bair, Freeman & Molinare
ATTORNEYS.

INVENTOR
JOHN L. MARTINSON
BY Bair, Freeman & Molinare
ATTORNEYS.

3,485,168

METHOD FOR FORMING WRITTEN SYMBOLS TO BE READ BY AUTOMATIC CHARACTER RECOGNITION EQUIPMENT

John L. Martinson, Washington, D.C., assignor to Meredith Publishing Co., a corporation of Iowa Filed Feb. 20, 1967, Ser. No. 617,252
Int. Cl. B41n 3/14
U.S. Cl. 101—426 2 Claims

ABSTRACT OF THE DISCLOSURE

An arrangement for manually producing accurate written symbols which are recognizable by optical scanning devices which use relatively simple logic. A pattern of invisible or semi-visible ink is deposited on a work surface, the pattern having the general shape of the superimposed combination of the several possible symbols to be written (such as the ten Arabic numerals). A special writing instrument is employed to "develop" the invisible pattern into the desired visible symbol. The distinctive elements of the symbol thus produced are accurately placed on the work sheet such that simple logic may be employed to generate an electronic signal indicative of the nature of the character.

BACKGROUND OF THE INVENTION

This invention relates generally to character recognition systems and, more particularly, to devices and methods for forming accurate written symbols for use with such apparatus.

A key to increasing the number of possible applications as well as the overall efficiency of electronic data processing equipment is the simplification of the methods of feeding data and instructions into the computer. Presently, data is normally supplied to the computer in specialized computer "language" carried on punched cards, magnetic tape or the like.

Several devices and schemes have been proposed in an effort to develop simplified computer input methods. For example, one method recently developed involves the use of a typewriter-like console which feeds information directly into a computer as that information is typed on a conventional keyboard. Also available are optical or magnetic scanning devices which are able to read certain styles of type. Scanning devices of this sort are generally used, for example, in banking where magnetic ink symbols serve to identify checks and the like according to the account number. However, such devices, besides requiring special printing devices and inks, are unable to verify signatures or to register the amount for which the check was written.

Very complicated optical scanning devices which do not rely on special printed symbols but which can "read" conventional printing are also available. Such devices can be extremely useful, for example, in machine translation of foreign language publications. Since it is normally necessary that the optical scanning system be able to "read" a variety of type sizes and styles, they must incorporate elaborate logic circuits. Because of the consequent complexity and cost of such systems, their commercial application has been quite limited. Optical scanning equipment capable of "reading" handwritten numerals and letters has also been developed but has been characterized by an even greater degree of cost and complexity.

SUMMARY OF THE INVENTION

In a principal aspect, the present invention takes the form of a method for manually yet accurately forming a selected one of a plurality of written symbols which may be "read" by a simple, automatic character recognition system. According to the invention, a prefiguration of invisible or semi-visible ink is first applied to a work surface, the prefiguration having the general shape of the superimposed combination of the plurality of symbols. Afterward, a writing instrument is employed to manually apply a developing material in the general shape of the selected symbol over the prefiguration. The developing agent interacts with the prefiguration to produce an image of the desired symbol which is both visible to the eye of the writer and discernible by the character recognition apparatus. Preferably, marks placed on the work sheet by the writing instrument outside of the prefiguration produce no substantial visible effect. Thus, the writer is immediately informed if his attempt to produce the symbol is inaccurate since only part of the intended symbol is actually formed. Moreover, the visible symbol which is produced is limited to the area of the prefiguration since the developing agent, by itself, is also invisible (or very light in color) except where it overlays the prefiguration. The precise placement and shape of the resultant visible character recognition apparatus employing extremely simple logic. Thus, symbols manually formed in accordance with the invention may be automatically "read" by simple, inexpensive equipment.

These and other features and advantages of the invention may be more clearly understood through a consideration of the attached drawings and the following detailed description.

DESCRIPTION OF THE PREFERRED EMBODIMENTS

Figures 1, 2A, 2B, 3A, 3B:
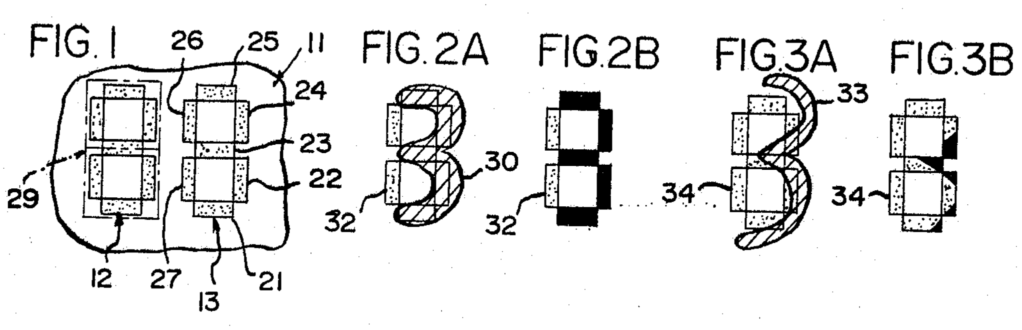
FIGURE 1 illustrates two side-by-side prefigurations, each of which is made up of an array of seven discrete elements.
FIGURES 2A and 2B illustrate the manner in which the numeral "3" is properly formed over the prefiguration.
FIGURES 3A and 3B illustrate the result of an inaccurate attempt to form the numeral "3" over the prefiguration.

FIGURE 1 of the drawings shows a work surface 11 onto which a pair of grid-like prefigurations indicated generally at 12 and 13 have been printed. Each prefiguration is made of seven distinct, spaced-apart elements 21 through 27. The prefigurations are formed on the work sheet by an ink containing a substantially colorless reactant capable of giving a colored reaction product, the colorless reactant being made visible upon contact with a developing agent. Before such contact, the prefiguration may be either semi-visible or completely invisible to the unaided eye, but must be indiscernible by the reading sensors in the character recognition apparatus (to be discussed in more detail below). When the character recognition arrangement employs "optical scanning,"

the prefiguration prior to contact with the developing agent should be either invisible or only lightly tinted.

An invisible ink compound especially useful for forming such prefigurations is disclosed in the copending application Ser. No. 634,466, now U.S. Patent No. 3,438,-927 filed by Joseph R. Ehrlich on Apr. 28, 1967. This ink composition comprises a low weight percentage of a bonding agent (polyvinyl pyrolidone resin) and a colorless reactant capable of giving a colored reaction product carried in an alcohol having four carbon atoms. This ink may be readily applied to the work surface by means of the modified offset printing method disclosed in the copending application Ser. No. 646,616 filed by Phillip Niblock on June 16, 1967.

The colorless reactant capable of giving a colored reaction product may take the form of propyl gallate which may be developed by the application of iron octoate. Alternatively, dimethyl glyoxime may be used as the colorless reactant capable of giving a colored reaction product, in which case nickel chloride may be employed as a developing agent. The polyvinyl pyrolidone resin acts to bond the colorless reactant capable of giving a colored reaction product to the printing surface after the alcohol solvent has evaporated.

The developing agent is carried in a writing instrument which may take the form of a conventional nylon or felt tipped pen. When the ink employed to form the prefiguration is substantially invisible, the peripheral edges of the prefiguration may be outlined with a visible guide line as illustrated in FIGURE 1 by the dotted line 29 around and through prefiguration 12. Alternatively, the "invisible" ink used may have a slight tint such that its general position and shape is readily discernible by the writer yet which is of insufficient darkness to be recognizable by the machine reader.

FIGURES 2A and 2B illustrate the manner in which a precisely formed character may be produced on the work sheet using the prefiguration illustrated in FIGURE 1. The shaded outline 30 illustrates the general shape of a developing agent coating scribed over a prefiguration 32 by means of writing instrument to form the numeral "3." The developing agent coating 30 causes five of the seven elements of the prefiguration 32 to be rendered visible as shown in FIGURE 2B.

If the character is carelessly written, as illustrated by FIGURES 3A and 3B, the prefiguration is only partially developed such that the inaccuracy is obvious. As illustrated in FIGURE 3A, a careless attempt to form the numeral "3" (indicated by the shaded region 33) over prefiguration 34 produces only a partially developed character as indicated by FIGURE 3B. In this case, the numeral "3" was made slightly too large and spaced somewhat to the right of its proper location. Since the prefiguration 34 was improperly developed as seen in FIGURE 3B, the failure to form the symbol with proper care is readily apparent to the writer (who may then complete the character correctly).

Figure 4:
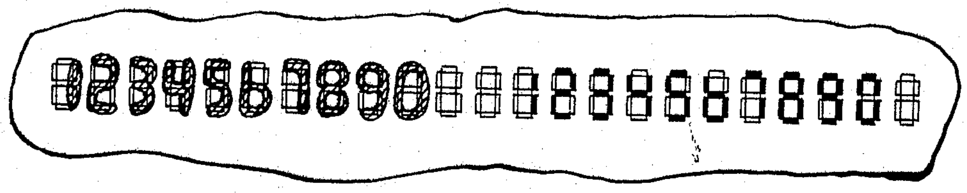
FIGURE 4 depicts the manner in which the ten Arabic numerals may be formed using a prefiguration of the type shown in FIGURE 1.

As illustrated by FIGURE 4, the simple prefiguration depicted in FIGURE 1 may be employed to form any one of the ten Arabic numerals. It may be noted that the prefiguration takes on the general shape of the superimposed combination of the ten possible numerals.

Figure 5:
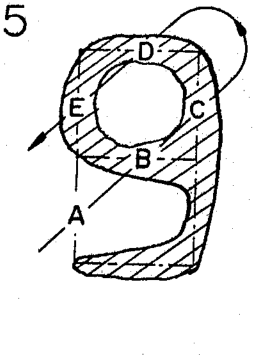
FIGURE 5 illustrates the manner in which a symbol produced in accordance with the invention may be "read" automatically by sampling five points on the prefiguration.

The use of the present invention produces precisely shaped characters which may be simply and accurately "decoded" by character recognition apparatus using extremely simple logic. As illustrated by FIGURE 5, the region of the prefiguration may be optically scanned, sampling five of the seven distinct elements of the prefiguration at points "A" through "E." (As will be readily appreciated by those skilled in the art, the five sampling points may be sensed simultaneously rather than in the sequence depicted in FIGURE 5.)

Figure 6:
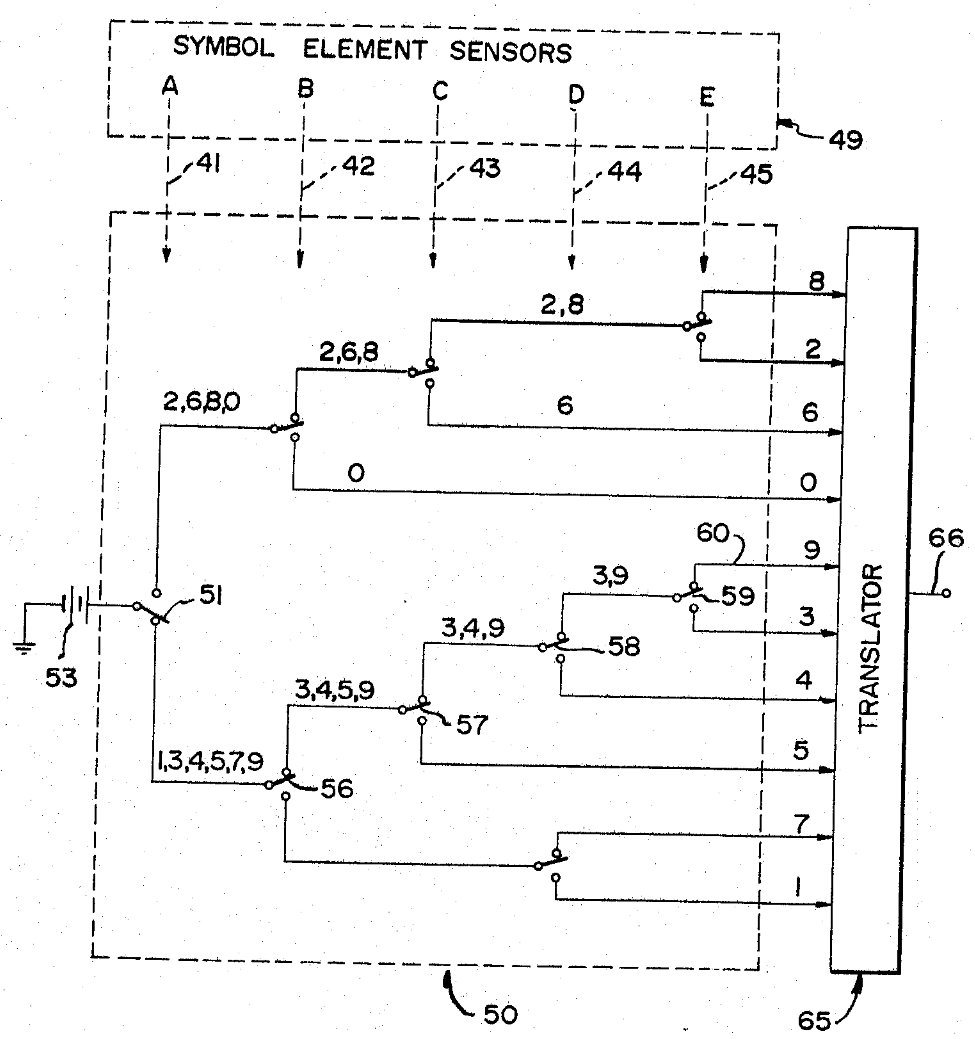
FIGURE 6 illustrates schematically an automatic gating circuit which may be employed to translate the results of the five "samples" taken as in FIGURE 5 into an electrical signal indicative of the identity of the symbol written.

The signals derived from each sample taken may then be employed to operate electronic gates which "translate" the five samples into a signal indicative of the character formed. An illustrative logic arrangement for performing this function is depicted in FIGURE 6. The sampling system indicated generally at 49 in FIGURE 6 produces five distinct signals (indicated by the dashed arrows 41 through 45), one of each sample "A" through "E." These sample signals are then employed to operate logic gates within a switching network indicated generally within the dotted rectangle 50.

In the network 50, the signal 41 (from sample "A") is employed to operate a switch 51. If the signal 41 is indicative of a dark area, the switch 51 is moved to the the upper position, thus indicating the numeral in question is either a 2, 6, 8 or 0. If the signal 41 indicates that the region at sample "A" was not developed by contact with the writing instrument, the switch 51 is moved into its lower position, indicating that the symbol is either 1, 3, 4, 5, 7, or 9.

In a similar manner, the remaining sample signals are employed to control the other switches in network 50 as shown in FIGURE 6. Accordingly, for the samples taken as shown in FIGURE 5, the positive terminal of supply battery 53 is connected via switch 51, and switches 56, 57, 58, and 59 to energize the conductor 60 which is indicative of the numeral "9". The output conductor 60 and the nine other numeral indicating conductors thus deliver a "one-hot" code to a code translator 65. The translator 65 may be employed to convert the "one-hot" code from network 50 into a more conventional binary code group which is delivered to output conductor 66.

Figure 7:
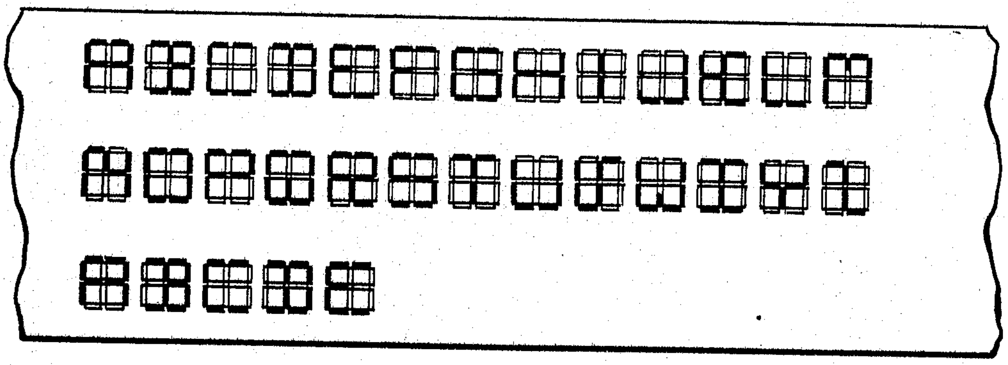
FIGURE 7 illustrates a somewhat more complicated prefiguration and the manner in which it may be employed to precisely form the letters of the Roman alphabet.

The use of a grid-like prefiguration of invisible or semi-visible ink in conjunction with a writing instrument carrying a developing agent may be used to accurately form letters or other characters as well as numerals. For example, FIGURE 7 of the drawings illustrates the use of a somewhat more complicated prefiguration for forming the letters of the Roman alphabet. As before, the prefiguration employed takes the form of the superimposed combination of the various symbols to be reproduced.

What is claimed is:

1. A method for determination by means of mechanical devices the symbolic content of a work sheet having scribed thereon at least one numeral from a set of hand written Arabic numerals comprising the steps of:

printing distinct visible ink outlines on said work sheet, said outline comprising seven distinct, visible, equally sized linear segments arranged to form a pattern of two squares, one above the other, only one of said numerals being scribed in each outline;

printing an invisible ink prefiguration on said work sheet within each of said visible ink outlines said prefiguration comprising seven distinct, invisible, equally sized rectangular spaced elements within the visible ink outlines, said invisible ink containing a colorless reactant that forms a visible product upon reaction with an activating reactant;

forming an Arabic numeral within at least one of said outlines by means of a writing instrument which dispenses said activating reactant; and scanning said outlines on said work sheet to provide an identification of said numerals and the content of said work sheet.

2. A method for determination by means of mechanical devices the symbolic content of a work sheet having scribed thereon at least one letter from a set of Roman letters comprising the steps of:

printing distinct visible ink outlines on said work sheet, said outlines comprising seven distinct, visible, equally sized linear segments arranged to form a pattern of two squares, one above the other, only one of said letters being scribed in each of said outlines;

printing an invisible ink prefiguration on said work sheet within each of said visible ink outlines, said prefiguration comprising a series of twelve distinct equally sized, rectangularly-shaped elements arranged to form a large square divided into four equal smaller squares said invisible ink containing a colorless reactant that forms a visible product upon reaction with an activating reactant;

forming a Roman letter within at least one of said outlines by means of a writing instrument which dispenses said activating reactant; and scanning said outlines on said work sheet to provide an identification of said letters and the content of said work sheet.

References Cited

UNITED STATES PATENTS

| | | | |
|---|---|---|---|
| 3,242,855 | 3/1966 | Noll et al. | 197—1 XR |
| 1,165,663 | 12/1915 | Goldberg | 235—61.12 |
| 2,038,516 | 4/1936 | McIntosh | 117—1.7 |
| 2,735,617 | 2/1956 | Knutsen. | |
| 2,963,220 | 12/1960 | Kosten | 340—146.3 |
| 3,363,338 | 1/1968 | Skinner et al. | 35—36 |

FOREIGN PATENTS

| | | |
|---|---|---|
| 851,604 | 10/1960 | Great Britian. |

ROBERT E. PULFREY, Primary Examiner

F. FREI, Assistant Examiner

U.S. Cl. X.R.

35—36; 117—1.7; 235—61.11; 340—146.3